UNITED STATES PATENT OFFICE.

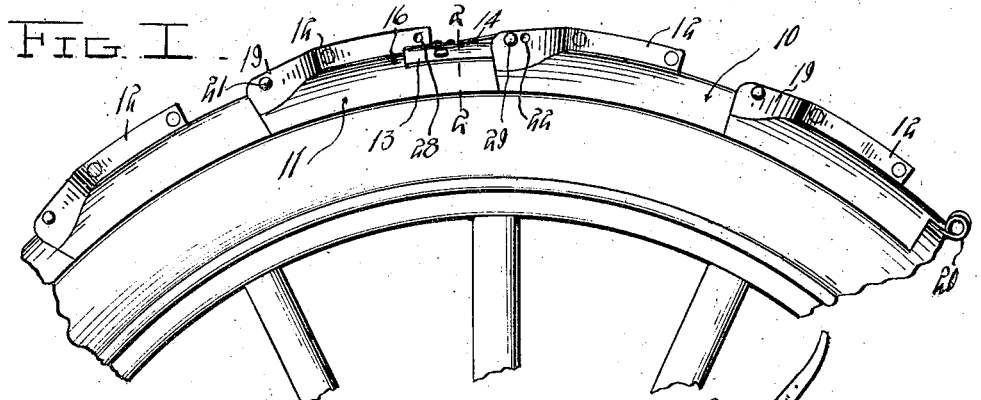
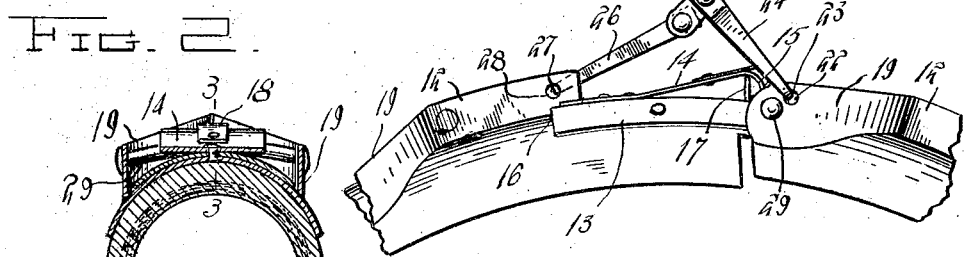
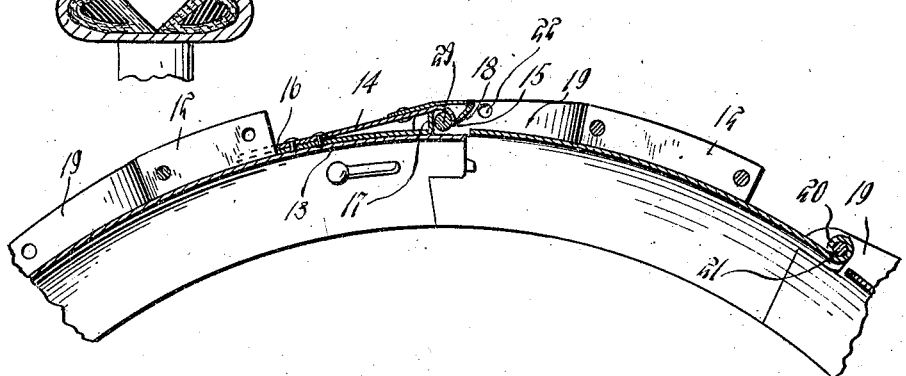

PETER A. CHRISTENSON, OF BENSON, MINNESOTA.

TIRE ARMOR.

1,153,194.

Specification of Letters Patent. Patented Sept. 14, 1915.

Application filed March 11, 1914. Serial No. 824,072.

*To all whom it may concern:*

Be it known that I, PETER A. CHRISTENSON, a citizen of the United States, residing at Benson, in the county of Swift, State of Minnesota, have invented certain new and useful Improvements in Tire-Armor; and I do hereby declare the following to be a full, clear, and exact description of the invention, such as will enable others skilled in the art to which it appertains to make and use the same.

This invention relates to improvements in tire armors, and particularly to armors for pneumatic tires for automobiles.

The principal object of the invention is to provide novel means for locking the ends of the armor together, and also novel means for drawing the ends of the armor together to engage the locking means.

Other objects and advantages will be apparent from the following description when taken in connection with the accompanying drawings.

In the drawings: Figure 1 is an elevation of a fragment of a wheel and tire showing my armor thereon and in locked position, Fig. 2 is a transverse section on the line 2—2 of Fig. 1, Fig. 3 is a vertical longitudinal section on the line 3—3 of Fig. 2, and Fig. 4 is a side elevation of a fragment of the tire and armor showing the operation of the means for drawing the ends of the armor together.

Referring particularly to the accompanying drawing, 10 and 11 designate respectively the end links of the tire armor, each of the links being formed with a ground engaging rib 12. Slidably mounted on the link 11 is a sliding plate 13 to which is secured a spring plate 14 which has its free end turned down as shown at 15. One end of this plate 13 and like-wise of the spring is bifurcated as shown at 16, with the legs of the bifurcation embracing the adjacent rib 12. At the inner end of the plate is an upturned lug 17 which projects upwardly and supports the downturned end of the spring rearwardly of the downturned portion. Secured on the upper side of the free end of the spring is a beveled ended projection 18 which extends slightly beyond the downturned end of the spring. The rib of each of the other links of the armor diverges at one end of the link, as indicated at 19, and passed through the diverging end and through the rolled tongue 20 of the end of the adjacent link is a pivot pin or bolt 21. The end link 10 has an additional pair of openings 22 in the diverging portions of its rib which received the inturned ends 23 of a yoke 24. This yoke is arranged to be readily engaged with and disengaged from the rib. Pivoted in the upper portion of the yoke is a lever 25 which has pivoted at one end a link 26 provided with a hook 27 on its outer end. This yoke is arranged to be engaged in an opening 28 in the adjacent end of the next link.

In the operation of the device the armor is placed on the tire, and the end links placed in juxta-position. The yoke member is then engaged in the divergent portion of the rib and the hook of the link engaged in the opening of the link of the other end of the armor. By rocking the lever, the link will be drawn so that the end links will be pulled together. Carried by the divergent portions of the rib of the link 10 is a transverse pin or bolt 29 which will engage the beveled end of the projection 18 and raise the spring 14, the said bolt then passing under the downturned end of the spring and against the stop lug 17. When the bolt engages the lug the spring 14 will drop and engage its downturned end at the other side of the bolt. The end links 10 and 11 will thus be securely fastened together. When so fastened, the yoke and attached lever and link are removed from the link 10. The fact that the plate 13 is slidably mounted on the link 11 permits a slight expansion and contraction of the armor.

What is claimed is:—

In a tire armor, a plurality of pivotally connected links, each of which is formed with a longitudinally extending rib which is bifurcated at one end, the bifurcated end of the rib of one of the end links having a transverse pin therein, a plate slidably mounted on the other end link, a spring latch member carried by the slidable plate for engagement with the transverse pin of the before-mentioned end link, and a beveled nose on the outer end of the spring latch member for engagement with the said pin to guide the latch into engagement with the pin when the links are drawn together.

In testimony whereof, I affix my signature, in the presence of two witnesses.

PETER A. CHRISTENSON.

Witnesses:
C. A. CHRISTENSON,
M. A. OVERLIE.